United States Patent
Veluswamy et al.

(10) Patent No.: US 11,698,854 B2
(45) Date of Patent: Jul. 11, 2023

(54) GLOBAL EXTENSION OF A LOGICAL-TO-PHYSICAL REGION OF A DATA STORAGE DEVICE

(71) Applicant: Western Digital Technologies, Inc., San Jose, CA (US)

(72) Inventors: Senthil Kumar Veluswamy, Bangalore (IN); Lingaraj Bal, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/411,918

(22) Filed: Aug. 25, 2021

(65) Prior Publication Data

US 2023/0061338 A1 Mar. 2, 2023

(51) Int. Cl.
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0619* (2013.01); *G06F 3/0659* (2013.01); *G06F 3/0673* (2013.01); *G06F 12/0253* (2013.01); *G06F 2212/7201* (2013.01)

(58) Field of Classification Search
CPC ...... G06F 3/0619; G06F 3/064; G06F 3/0659; G06F 3/0673; G06F 12/0246; G06F 12/0253; G06F 2212/7201
See application file for complete search history.

(56) References Cited

U.S. PATENT DOCUMENTS

| | | | |
|---|---|---|---|
| 10,635,598 B2 | 4/2020 | Veal et al. | |
| 10,725,941 B2 | 7/2020 | Subbarao et al. | |
| 10,860,508 B2 | 12/2020 | Bolkhovitin et al. | |
| 2016/0062677 A1* | 3/2016 | Samuels | G06F 3/0655 711/103 |
| 2017/0139761 A1* | 5/2017 | Song | G06F 12/02 |
| 2019/0354293 A1* | 11/2019 | Kwon | G06F 3/0679 |

(Continued)

OTHER PUBLICATIONS

Bates, "Avoiding the NVM Express bottleneck with NVMe CMBs, Eideticom and SPDK," available at <https://www.eideticom.com/media-news/blog/25-avoiding-the-nvm-express-bottleneck-with-nvme-cmbs-eideticom-and-spdk.html> blog published Feb. 26, 2018 (9 pages).

(Continued)

*Primary Examiner* — Nanci N Wong
(74) *Attorney, Agent, or Firm* — Michael Best & Friedrich LLP

(57) ABSTRACT

A data storage device coupled to a controller. The controller is configured to determine whether a request to perform a data transfer operation has been received and determine whether a request to perform a garbage collection operation is necessary during the data transfer operation. The controller generates an extended logical-to-physical table (L2P) including information for the data transfer operation in response to determining the request to perform the data transfer operation has been received and the request to perform the garbage collection operation is necessary, transmits the extended L2P table to one or more peer data storage devices, and performs the garbage collection operation after transmitting the extended L2P table to the one or more peer data storage devices.

20 Claims, 4 Drawing Sheets

(56) References Cited

U.S. PATENT DOCUMENTS

| | | | |
|---|---|---|---|
| 2019/0384506 A1 | 12/2019 | Shivanand et al. | |
| 2020/0242489 A1* | 7/2020 | Hama | G06F 3/14 |
| 2020/0401513 A1* | 12/2020 | He | G06F 12/0253 |
| 2022/0197509 A1* | 6/2022 | Kim | G06F 12/0246 |

OTHER PUBLICATIONS

Bates, "Enabling the NVMe CMB and PMR Ecosystem," available at <https://nvmexpress.org/wp-content/uploads/Session-2-Enabling-the-NVMe-CMB-and-PMR-Ecosystem-Eideticom-and-Mell . . . pdf> presentation dated May 1, 2018 (13 pages).

Gibb et al., "An NVMe-based Offload Engine for Storage Acceleration," available at <https://www.snia.org/sites/default/files/SDC/2017/presentations/NVMe/Gibb_Sean_Bates_Stephen_An_NVMe-based_Offload_Engine_for_Storage_Acceleration.pdf> Storage Developer Conference, 2017 (21 pages).

* cited by examiner

GLOBAL EXTENSION OF A LOGICAL-TO-PHYSICAL REGION OF A DATA STORAGE DEVICE

FIELD

This application relates generally to data storage devices, and more particularly, to a controller that controls extension of a logical-to-physical ("L2P") region of a data storage device to one or more peer data storage devices.

BACKGROUND

Datacenters may host one or more cloud-based services (e.g., Platform as a Service ("PaaS"), Infrastructure as a Service ("Iaas"), or Software as a Service ("Saas")). As the use of cloud-based services increases over time, the demand for greater computing power, network bandwidth, and storage space increases along with a growing rate of input-output operations ("I/Os") per second ("IOPS"). To cope with these increasing demands for storage space, datacenters are moving away from Hard Disk Drive ("HDD") based traditional storage array and implementing non-volatile memory express solid state drive ("NVMe SSD") based all-flash-arrays ("AFAs"). Though AFAs are able to achieve needed throughput/IOPS with low latencies, NVMe SSD based AFA products are subject to unpredictable performance.

For example, NVMe SSDs that are used in datacenters for an extended period of time may experience wear which results in one or more bad blocks of memory. Over time, as the number of bad blocks increases, the need to perform garbage collection to recover the bad blocks arises. When garbage collection is performed, the NVMe SSD cannot quickly process I/Os to/from the host device until garbage collection is completed. The duration in which garbage collection is completed may vary based on the total number of bad blocks. Thus, IOPS and latency of the NVMe SSD is highly variable based on the number of bad blocks for which garbage collection needs to be performed.

Typically, to avoid unpredictable SSD behavior, Open-Channel SSD ("OC-SSD") are utilized. Using OC-SSD, the flash translation layer ("FTL") is moved from the SSD firmware out to a host device and is controlled by the host device. The host-side FTL, however, requires the host device to perform garbage collection, thus placing computational strain on the host device and removing control of the FTL and the garbage collection process from the storage device.

SUMMARY

Generally, data storage device garbage collection is performed individually by the data storage device. Alternatively, in some systems, garbage collection is performed by a host device in communication with the data storage device. Introducing an extendable L2P region technique to NVMe SSDs by bringing a portion of the L2P region to the outside of the NVMe SSD so that it can be mapped to an extended physical region of another peer NVMe SSD would allow for consistent performance of the NVMe SSD and alleviate the need for a host device to perform garbage collection.

One embodiment of the present disclosure includes a data storage device including a controller. The controller is configured to determine whether a request to perform a data transfer operation has been received and determine whether a request to perform a garbage collection operation is necessary during the data transfer operation. The controller generates an extended logical-to-physical (L2P) table including information for the data transfer operation in response to determining the request to perform the data transfer operation has been received and the request to perform the garbage collection operation is necessary, transmits the extended L2P table to one or more peer data storage devices, and performs the garbage collection operation after transmitting the extended L2P table to the one or more peer data storage devices.

Another embodiment of the present disclosure includes a method performed by a data storage device. The method includes: determining, via a controller, whether a request to perform a data transfer operation has been received and determining whether a request to perform a garbage collection operation is necessary during the data transfer operation. The method further includes generating, via the controller, an extended logical-to-physical (L2P) table including information for the data transfer operation in response to determining the request to perform the data transfer operation has been received and the request to perform the garbage collection operation is necessary, transmitting the extended L2P table to one or more peer data storage devices, and performing the garbage collection operation after transmitting the extended L2P table to the one or more peer data storage devices Yet another embodiment of the present disclosure includes an apparatus including means for determining whether a request to perform a data transfer operation has been received at a data storage device and means for determining whether a request to perform a garbage collection operation is necessary during the data transfer operation. The apparatus further includes means for generating an extended logical-to-physical (L2P) table including information for the data transfer operation in response to determining the request to perform the data transfer operation has been received and the request to perform the garbage collection operation is necessary, means for transmitting the extended L2P to one or more peer data storage devices, and means for performing the garbage collection operation after transmitting the extended L2P table to the one or more peer data storage devices.

Various aspects of the present disclosure provide for improvements in data storage devices. For example, optimizing the processes in which garbage collection and host device I/Os are handled by data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, etc.

Figure 1:
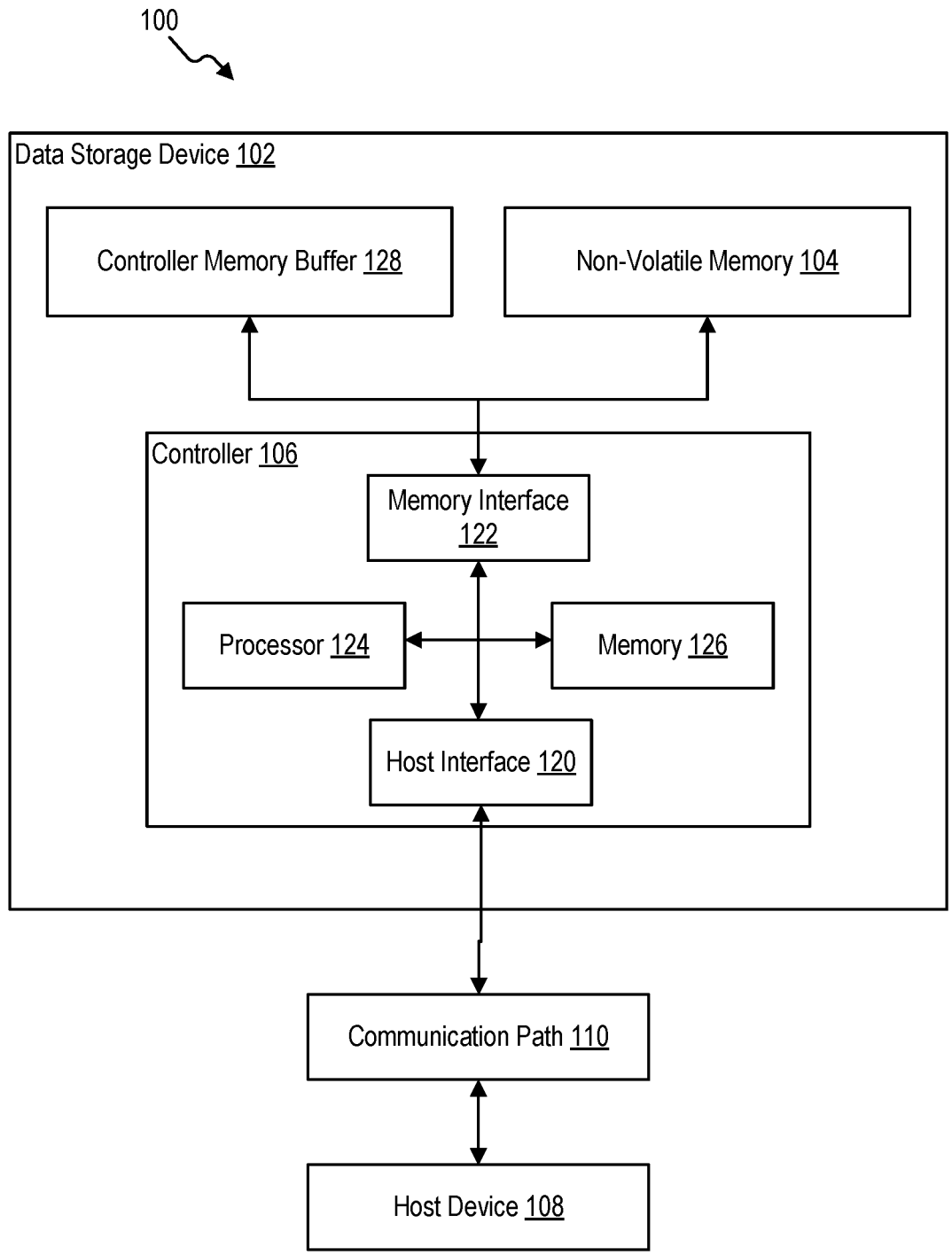
FIG. 1 is block diagram illustrating one example of a system for global extension of an L2P region of a data storage device, according to some embodiments.

FIG. 1 is a block diagram illustrating one example of a system 100 for global extenuation of an L2P region of a data storage device, in accordance with some embodiments of the disclosure. In some implementations, the data storage device 102 is a flash memory device. For example, the data storage device 102 is a solid state drive ("SSD"), such as an NVMe SSD, a Secure Digital SD® card, a microSD® card, or another similar type of data storage device. The data storage device 102 illustrated in FIG. 1 includes a non-volatile memory 104, a controller 106, and a controller memory buffer ("CMB") 128. The data storage device 102 is coupled to a host device 108.

The data storage device 102 and the host device 108 may be operationally coupled via a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to an SSD, which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 108, such as a wired communication path and/or a wireless communication path. For example, the data storage device 102 may include a host interface 120 that enables communication between the data storage device 102 and the host device 108, such as when the host interface 120 is communicatively coupled to the host device 108. In some examples, the communication between the data storage device 102 and the host device 108 includes transmitting data between the non-volatile memory 104 and the host device 108.

The host device 108 may include an electronic processor and a memory 126. The memory 126 may be configured to store data and/or instructions that may be executable by the electronic processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to a non-volatile memory 104 of the data storage device 102. For example, the host device 108 may be configured to provide data to be stored at the non-volatile memory 104 or to request data to be read from the non-volatile memory 104.

The host device 108 communicates via a memory interface 122 that enables reading from the non-volatile memory 104 and writing to the non-volatile memory 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the non-volatile memory 104 in accordance with any other suitable communication protocol.

The non-volatile memory 104 of the data storage device 102 may include a non-volatile memory (e.g., NAND, BiCS family of memories, or other suitable memory). In some examples, the non-volatile memory 104 may be any type of flash memory. The non-volatile memory 104 may include one or more memory devices. For example, the non-volatile memory 104 may be two-dimensional (2D) memory or three-dimensional (3D) flash memory.

The non-volatile memory 104 may include support circuitry, such as read/write circuitry to support operation of the non-volatile memory 104. In some examples, the read/write circuitry may be implemented in a single component. Alternatively, in some examples, the read/write circuitry may be divided into separate components of the non-volatile memory 104, such as read circuitry and write circuitry.

The controller 106 includes a host interface 120, a memory interface 122, a processor 124 (for example, a microprocessor, a microcontroller, a field-programmable gate array ["FPGA"] semiconductor, an application specific integrated circuit ["ASIC"], or another suitable programmable device), and a memory 126 (for example, a random access memory ["RAM"], a read-only memory ["ROM"], a non-transitory computer readable medium, or a combination thereof). In some examples, the memory 126 may be configured to store data and/or commands that may be executable by the processor 124. The controller 106 is illustrated in FIG. 1 in a simplified form. One skilled in the art would recognize that a controller for a non-volatile memory may include additional modules or components other than those specifically illustrated in FIG. 1. Additionally, although the data storage device 102 is illustrated in FIG. 1 as including the controller 106, in other implementations, the controller 106 is instead located within the host device 108 or is otherwise separate from the data storage device 102. As a result, operations that would normally be performed by the controller 106 (for example, wear leveling, bad block management, data scrambling, garbage collection, address mapping, etc.) can be performed fully or in part by the host device 108 or another device that connects to the data storage device 102.

The controller 106 is configured to receive data and commands from the host device 108 and to send data to the host device 108. For example, the controller 106 may send data to the host device 108 via the host interface 120, and the controller 106 may receive data from the host device 108 via the host interface 120. The controller 106 is configured to send data and commands (e.g., a memory operation, which may be a command provided to the non-volatile memory 104) to the non-volatile memory 104 and to receive data from the non-volatile memory 104. For example, the controller 106 is configured to send data and a write command to cause the non-volatile memory 104 to store data to a specified address of the non-volatile memory 104. The write command may specify a physical address of a portion of the non-volatile memory 104 (e.g., a physical address of a word line of the non-volatile memory 104) that is to store the data.

The controller 106 is configured to send a read command to the non-volatile memory 104 to access data from a specified address of the non-volatile memory 104. The read command may specify the physical address of a region of the non-volatile memory 104 (e.g., a physical address of a word line of the non-volatile memory 104). The controller 106 may also be configured to send data and commands to the non-volatile memory 104 associated with background scanning operations, garbage collection operations, and/or wear-leveling operations, or other suitable memory operations.

The controller 106 may send a memory operation (e.g., a read command) to the non-volatile memory 104 to cause read/write circuitry to sense data stored in a storage element. For example, the controller 106 may send the read command to the non-volatile memory 104 in response to receiving a request for read access from the host device 108. In response to receiving the read command, the non-volatile memory 104 may sense the storage element (e.g., using the read/write circuitry) to generate one or more sets of bits representing the stored data.

The CMB 128 may be, for example, a peripheral component interconnect express base address register ("PCIe BAR") that is used as a direct memory access ("DMA") buffer to achieve peer-to-peer ("P2P") data copy between a plurality of data storage devices (e.g., two NVMe SSDs). In some examples, the CMB 128 is an individual component of the data storage device 102. For example, the CMB 128 may be a controller with components similar to that of the controller 106. In some examples, the CMB 128 is included in the memory 126 of the controller 106. Although the data storage device 102 is illustrated in FIG. 1 as including the CMB 128, in other implementations, the CMB 128 is instead located externally from the data storage device 102 or is otherwise separate from the data storage device 102.

Figure 2:
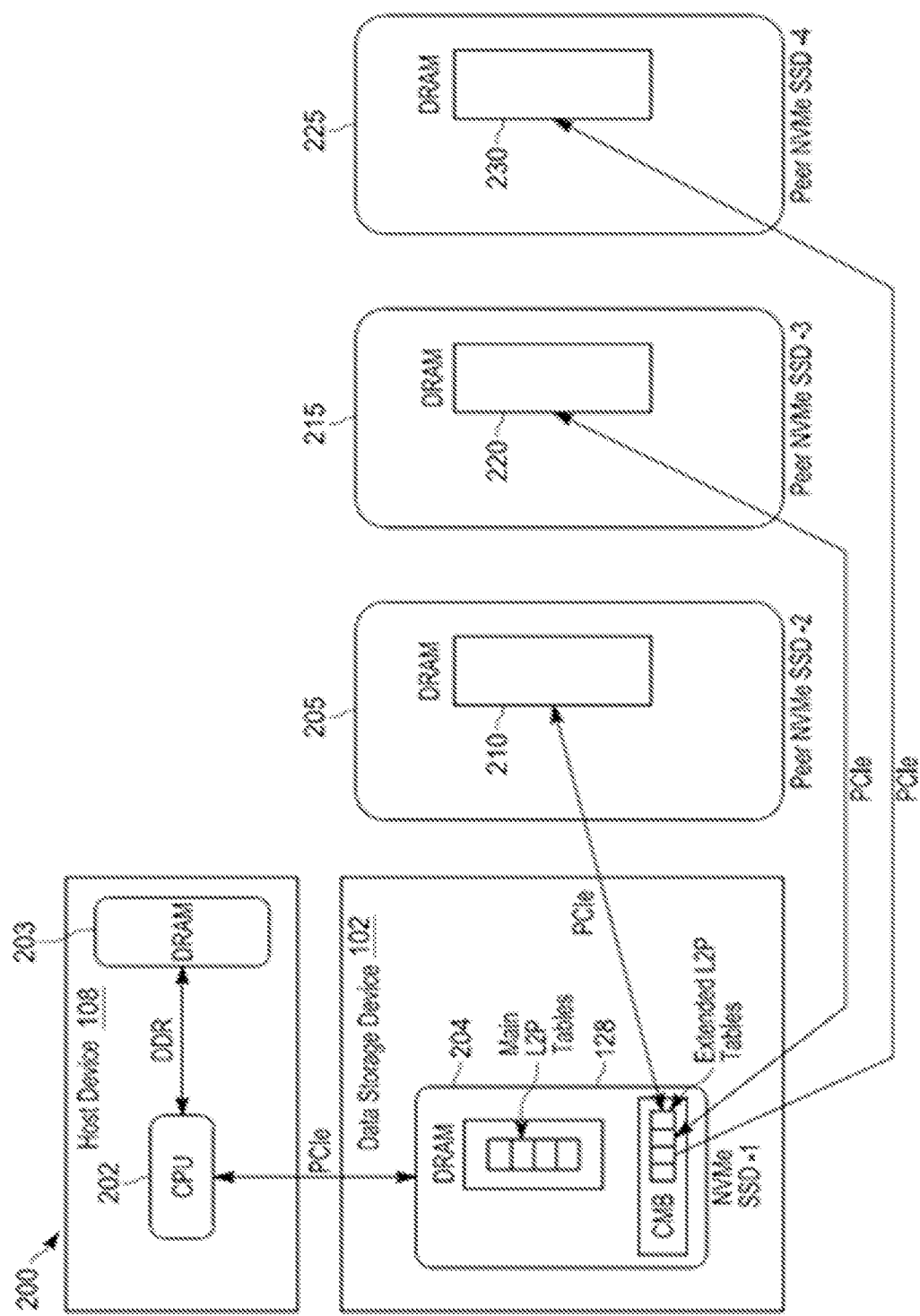
FIG. 2 is block diagram illustrating one example of a data flow for the system for global extension of an L2P region of a data storage device of FIG. 1, according to some embodiments.

Turning now to FIG. 2, a block diagram illustrating one example of a data flow 200 of the system 100 for global extension of an L2P region of the data storage device 102 is shown, according to some embodiments.

The data flow 200 includes the host device 108, the data storage device 102, a second data storage device 205, a third data storage device 215, and a fourth data storage device 225. The data storage device 102 includes a DRAM 204 and the CMB 128. In some examples, the DRAM 204 is the memory 126. The host device 108 includes a processor 202 and a DRAM 203. In some examples, the second data storage device 205, the third data storage device 215, and the fourth data storage device 225 are in communication with each other and in communication the host device 108 in similar ways as described with respect to the data storage device 102 above. Although described herein for sake of simplicity that the data flow 200 only includes four data storage devices, it is to be understood that the data flow 200 may include any number data storage devices that are in communication with the host device 108. In the example illustrated, each of the second data storage device 205, the third data storage device 215, and the fourth data storage device 225 are NVMe SSDs and are illustrated as a component that is separate from the data storage device 102. In some examples, the second data storage device 205, the third data storage device 215, and the fourth data storage device 225 are included in the data storage device 102.

In some examples, whenever garbage collection operation occurs in the data storage device 102, in order to prevent a reduction in performance of I/Os to/from the host device 108, an extended L2P table is created. Since an L2P table, or region, is maintained within an NVMe SSD (e.g., data storage device 102) and controlled by the FTL of the data storage device 102, whenever a garbage collection occurs, most processing of the data storage device 102 is assigned to completing garbage collection as quickly as possible.

To complete garbage collection as quickly as possible, the FTL of the data storage device 102 may reduce performance for the I/Os to/from the host device 108. In other words, if the data storage device 102 allows the same average performance for host I/Os, the L2P region is modified at the same performance level and block allocation for the I/Os of the host device 108 also occur at the same performance level. This scenario is not desirable as garbage collection is typically scheduled to recover blocks that have been marked as bad, thus the data storage device 102 cannot find good blocks for I/Os to/from the host device 108. From the perspective of the host device 108, garbage collection is an internal problem of the data storage device 102, thus the host device 108 expects the same average performance from the data storage device 102 at all times.

In some examples, an extended L2P table is created in the CMB 128 of the data storage device 102 by fetching a physical block from a memory of a plurality of peer data storage devices that are in communication with the data storage device 102 (e.g., a dynamic random access memory ("DRAM") 210 of the second data storage device 205, a DRAM 220 of the third data storage device 215, or a DRAM 230 of the fourth data storage device 225). I/Os from the host device 108 that would normally correspond to the data storage device 102 are redirected one of the plurality of peer data storage devices 205-225. For example, I/Os to/from the host device 108 may be redirected to the second data storage device 205 via the DMA engine of the CMB 128 using a PCIe address. Thus, while processing garbage collection in the data storage device 102, the extended L2P table of the data storage device 102 that is stored in memory 126 is not disturbed and all I/Os to/from the host device 108 are redirected to the second data storage device 205. Accordingly, the garbage collection performed at data storage device 102 can be executed at a faster rate, and I/Os to/from the host device 108 are processed closer to the same average performance as if the data storage device 102 where processing both garbage collection and I/Os to/from the host device 108.

In some examples, the I/Os to/from the host device 108 are processed by the one or more peer data storage devices. For example, each of the one or more peer data storage devices may include a controller configured to process I/Os to/from the host device 108 and communicate with the host device 108. In some examples, after garbage collection is completed at the data storage device 102, I/Os to/from the host device 108 are copied from the one or more peer data storage devices back to the data storage device 102. For example, in a case of a host write operation, the one or more peer data storage devices may write data to a memory of the one or more peer data storage devices, and after the garbage collection is completed at the data storage device 102, transmit the data for storage at the data storage device 102.

In some examples, the data storage device 102 may integrate the I/Os to/from the host device 108 that are processed at the one or more peer data storage devices into the main L2P table of the data storage device 102. For example, in a case of a host write operation, data may be written and maintained at the one or more peer data storage devices and the location of the data stored in the main L2P table of the data storage device 102. In some examples, the host device 108 may transmit a read operation to the data storage device 102 for data that has been stored at the one or more peer data storage devices. For example, the data storage device 102 may transmit a read request to the one or more peer data storage devices to read the data stored in the one or more peer data storage devices. The one or more peer data storage devices may transmit the requested data to the data storage device 102. After receiving the data from the one or more peer data storage devices, the data storage device 102 may transmit the requested data to the host device 108.

Figure 3:
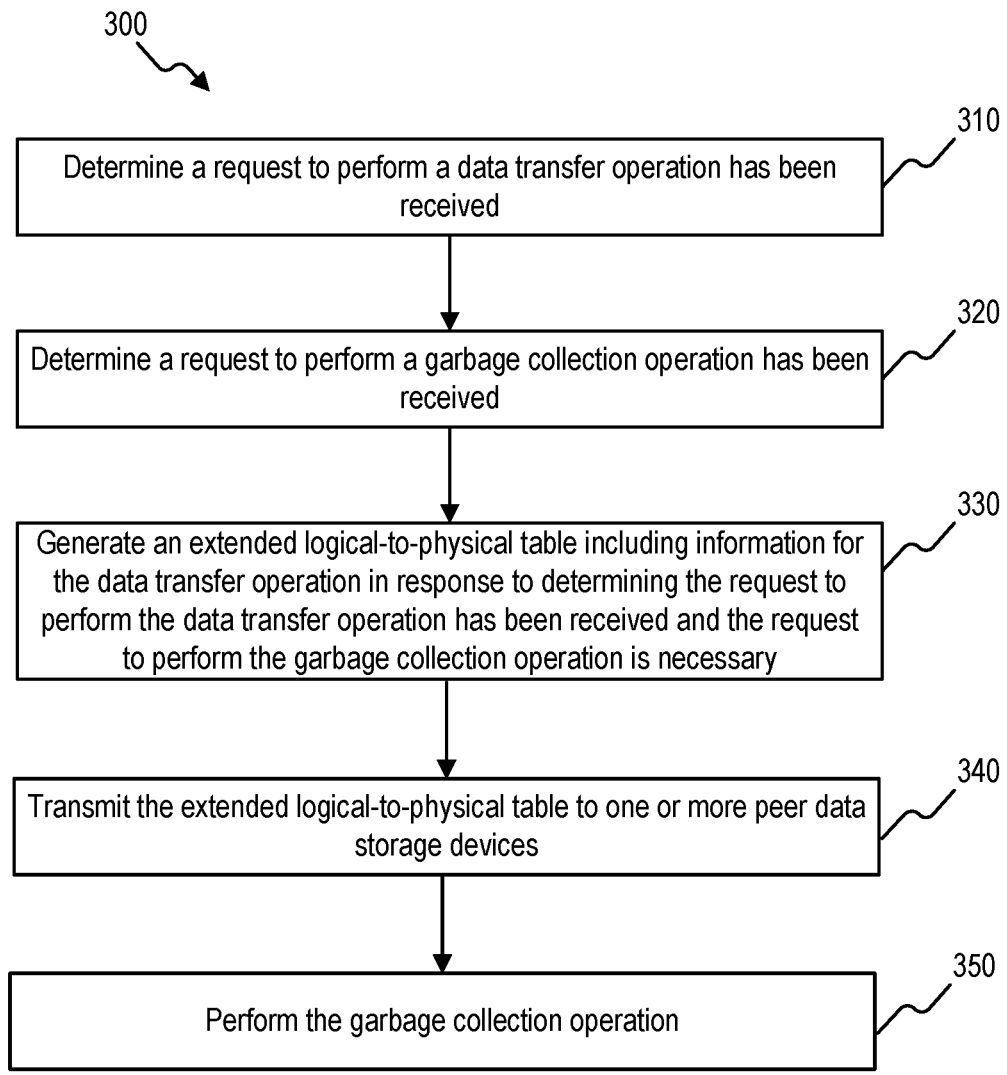
FIG. 3 is a flow chart illustrating a method for global extension of an L2P region of a data storage device, according to some embodiments.

Turning now to FIG. 3, a flow chart illustrating a method 300 for global extension of an L2P region of a data storage device is shown, according to some embodiments. The method 300 the data storage device 102 determining whether a request to perform a data transfer operation with an external electronic device (e.g., the host device 108) has been received (at block 310). In some examples, the data storage device 102 determines the request to perform the data transfer via the processor 124. For example, the processor 124 may be configured to receive one or more commands from the host device 108 to initiate a data transfer operation between the host device 108 and the data storage device 102. The data storage device 102 may determine a request to perform a data transfer operation has been received based on the one or more commands from the host device 108.

The method 300 includes the data storage device 102 determining whether a request to perform a garbage collection operation has been received (at block 320). In some examples, a request to perform a garbage collection operation is generated by the data storage device 102 itself. For example, after determining a predetermined number of blocks of memory of the data storage device 102 are classified as bad blocks of memory, the processor 124 may generate a command to perform a garbage collection operation to recover the bad blocks of memory.

In some examples, in response to receiving both a request to perform a data transfer to an external electronic device and a request to perform a garbage collection operation, the data storage device 102 may have reduced performance. For example, when a garbage collection operation is performed, the processor 124 may allocate most processing resources to completing the garbage collection operation. Thus, less processing resources are available for allocation for other operations such as, for example, data transfer operations or host device 108 I/Os.

Accordingly, the method 300 further includes the data storage device 102 generating an extended L2P table including information for I/O operations to/from the host device 108 received by the data storage device 102 (at block 330) in response to determining the request to perform the data transfer operation has been received and the request to perform the garbage collection operation is necessary. In some examples, the extended L2P table including information for the I/O operations to/from the host device 108 is generated by the processor 124. In some examples, the extended L2P table is transmitted, from the memory 126, to the CMB 128.

The method 300 includes the data storage device 102 transmitting the L2P table to one or more peer storage devices (at block 340). For example, the data storage device 102 may transmit the extended L2P table to the second data storage device 205, the third data storage device 215, the fourth data storage device 225, or any number of other data storage devices that are peer storage devices to the data storage device 102. In some examples, the extended L2P table including information for I/O operations to/from the host device 108 is transmitted to the one or more external electronic device because the data storage device 102 has reduced processing resources resulting from receiving the request to perform a data transfer to an external electronic device and the request to perform a garbage collection operation. Thus, the data storage device 102 redirects I/Os to/from the host device 108 to the one or more peer storage devices via the extended L2P table in order to unburden the processing capabilities of the data storage device 102.

The method also includes the data storage device 102 performing the garbage collection operation (at 350). After the extended L2P table including information for the I/O operations to/from the host device 108 has been transmitted to the one or more peer data storage devices, I/Os to/from the host device 108 are processed by the one or more peer data storage devices. Thus, the data storage device 102 is unburdened from the need to perform both the requested I/O operation to/from the host device 108 and the requested garbage collection operation. Accordingly, the data storage device 102 can perform the garbage collection operation in parallel with the one or more peer data storage devices performing the I/Os to/from the host device 108. Thus, from the perspective of the host device 108, a reduction in performance of I/Os to/from the host device 108 has not occurred in response to the data storage device 102 performing a garbage collection operation.

Figure 4:
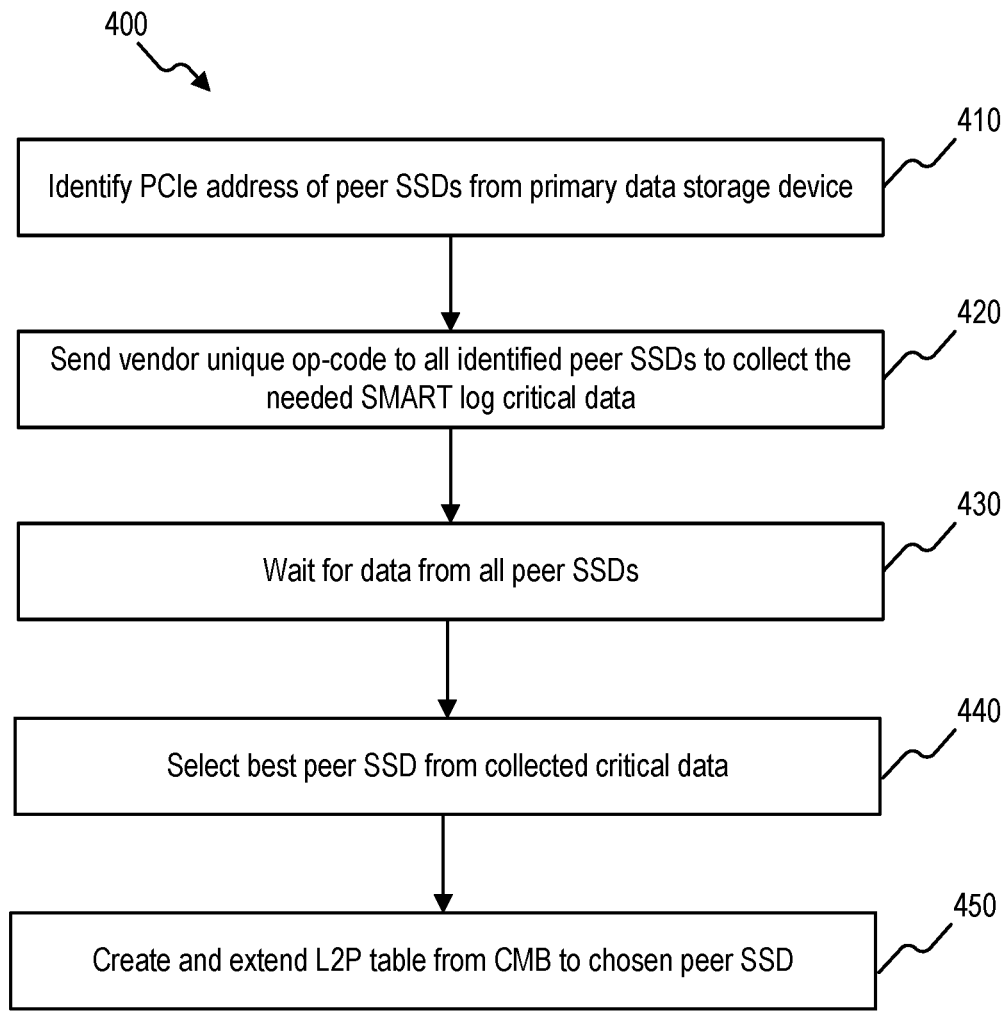
FIG. 4 is a flow chart illustrating a method for selecting a peer data storage device, according to some embodiments.

Turning now to FIG. 4, a flow chart illustrating a method 400 for selecting a peer data storage device is shown, according to some embodiments. The method 400 includes the data storage device 102 identifying a plurality of peripheral component interconnect express ("PCIe") addresses of peer data storage device, or SSDs (at block 410). The PCIe address is used as a DMA buffer to achieve P2P data copy between one or more of the peer SSDs. For example, referring to the data flow 200 of FIG. 2, each of the data storage device 102, the second data storage device 205, the third data storage device 215, and the fourth data storage device 225 may have a unique PCIe address which identifies each corresponding data storage device. In some examples, the processor 124 detects the PCIe address identifier of each peer SSD and store the PCIe address to the memory 126 of the data storage device 102.

The method 400 includes the data storage device 102 transmitting a vendor unique op-code ("VUC") to all peer SSDs identified to collect SMART log critical data (at block 420). The VUC can be exchanged between SSDs so that each SSD will share its SMART log critical data. For example, the SMART log critical data may include a retired block count, a write amplification, a percent of drive life remaining, a program fail count, an erase count, a temperature warning, a critical temperature, a percent uncorrectable error count, a percentage of drive life used, a number of write counts, or other information that may be included in the SMART log critical data.

The method 400 includes the data storage device 102 waiting for data from all peer SSDs (at block 430). In some examples, the data storage device 102 waits to receive SMART log critical data from each data storage device included in the group of peer SSDs. In other examples, the data storage device 102 waits for a predetermined amount of time before continuing to block 440.

The method 400 includes the data storage device 102 selecting the best peer SSD from the collected SMART log critical data (at block 440). In some examples, the selection is based on the SMART log critical data received from each peer SSD. For example, the selection process may simply include determining the write amplification of each peer SSD and selecting the SSD with the lowest write amplification. In some examples, the selection may be based on all or a subset of the information included in the SMART log critical data. In some examples, the process used to select the best peer SSD may be a random selection of one or more of the available peer SSDs.

The method 400 also includes the data storage device 102 creating and extending an L2P table from the CMB 128 to the selected peer SSD (at block 450). For example, an extended L2P table may be created in the CMB 128 of the data storage device 102 by fetching a physical block from a memory of one or more peer data storage devices that are in communication with the data storage device 102 (e.g., a dynamic random access memory ("DRAM") 210 of the second data storage device 205, a DRAM 220 of the third data storage device 215, or a DRAM 230 of the fourth data storage device 225).

In some examples, after garbage collection is completed in the data storage device 102, there is no need to redirect I/Os from the host device 108 to a peer SSD, thus the data storage device 102 no longer needs to create an extended L2P table that is stored by the CMB 128. Accordingly, the data storage device 102 may clean the memory of the CMB 128.

In some examples, the memory of the CMB 128 may be cleaned by syncing data back from a secondary data storage device, for example, the second data storage device 205 to the data storage device 102. This method may increase write amplification, however, this method avoids the case where if the second data storage device 205 reboots and the data storage device 102 receives a I/O request to/from the host device 108 in the extended L2P region. If this happens, the data storage device 102 needs to hold the host device 108 I/O until access to the second data storage device 205 is restored. In the worst case scenario, the host device 108 will timeout the I/O and may attempt to retry the I/O from the host device 108.

In some examples, the memory of the CMB 128 may be cleaned by leaving the extended L2P table in the CMB 128 until it is invalidated by a new host device 108 I/O to the same region. If an overwrite happens during that time, the extended L2P table of the CMB 128 can be invalidated, deallocated, and allocated in the main L2P table itself. This method avoids write amplification, however, this method could introduce a scenario where a peer SSD may become unreachable for a short period of time.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method performed by a data storage device, the method comprising:
    determining, via a controller, whether a request to perform a data transfer operation has been received;
    determining, via the controller, whether a request to perform a garbage collection operation is necessary during the data transfer operation;
    generating, via the controller, an extended logical-to-physical (L2P) table including information for the data transfer operation in response to determining the request to perform the data transfer operation has been received and the request to perform the garbage collection operation is necessary;
    transmitting, via the controller, the extended L2P table to one or more peer data storage devices; and
    performing, via the controller, the garbage collection operation after transmitting the extended L2P table to the one or more peer data storage devices.

2. The method of claim 1, wherein the one or more peer data storage devices are configured to perform the data transfer operation after receiving the extended L2P table.

3. The method of claim 1, wherein the request to perform the garbage collection operation is a request after a number of blocks of memory of the data storage device are classified as bad exceeds a predetermined threshold.

4. The method of claim 1, wherein the data storage device is configured to communicate with the one or more peer data storage devices, and wherein the method further comprises:
    identifying, via the controller, a peripheral component interconnect express address of each of the one or more peer data storage devices; and
    receiving, via the controller, log data from the one or more peer data storage devices.

5. The method of claim 4, wherein the log data includes at least one of a group consisting of:
    a retired block count,
    a write amplification,
    a percent of drive life remaining,
    a program fail count,
    an erase count,
    a temperature warning,
    a critical temperature,
    a percent uncorrectable error count,
    a percentage of drive life used, and
    a number of write counts.

6. The method of claim 1, further comprising:
    selecting, via the controller, a subset of the one or more peer data storage devices, and
    transmitting, via the controller, the extended L2P table to the subset of the one or more peer data storage devices.

7. A data storage device comprising:
    a controller configured to:
        determine whether a request to perform a data transfer operation has been received,
        determine whether a request to perform a garbage collection operation is necessary during the data transfer operation,
        generate an extended logical-to-physical (L2P) table including information for the data transfer operation in response to determining the request to perform the data transfer operation has been received and the request to perform the garbage collection operation is necessary,
        transmit the extended L2P table to one or more peer data storage devices, and
        perform the garbage collection operation after transmitting the extended L2P table to the one or more peer data storage devices.

8. The data storage device of claim 7, wherein the data storage device includes the one or more peer data storage devices, and wherein the one or more peer data storage devices are configured to perform the data transfer operation after receiving the extended L2P table.

9. The data storage device of claim 7, wherein the request to perform the garbage collection operation is a request after a number of blocks of memory of the data storage device are classified as bad and exceed a predetermined threshold.

10. The data storage device of claim 7, wherein the data storage device is configured to communicate with the one or more peer data storage devices, and wherein the controller is further configured to:
    identify a peripheral component interconnect express address of each of the one or more peer data storage devices, and
    receive log data from the one or more peer data storage devices.

11. The data storage device of claim 10, wherein the log data includes at least one of a group consisting of:
    a retired block count,
    a write amplification,
    a percent of drive life remaining,
    a program fail count,
    an erase count,
    a temperature warning,
    a critical temperature,
    a percent uncorrectable error count,
    a percentage of drive life used, and
    a number of write counts.

12. The data storage device of claim 10, wherein the data storage device further includes a controller memory buffer, and wherein, to transmit the extended L2P table to the one or more peer data storage devices, the controller is further configured to transmit the extended L2P table to the one or more peer data storage devices via the controller memory buffer.

13. The data storage device of claim 12, wherein the controller is further configured to select a subset of the one or more peer data storage devices, and wherein, to transmit the extended L2P table to the one or more peer data storage devices, the controller is further configured to transmit the extended L2P table to the subset of the one or more peer data storage devices.

14. The data storage device of claim 13, wherein, to select the subset of the one or more peer data storage devices, the controller is further configured to determine the subset of the one or more peer data storage devices based on the log data that is received from the one or more peer data storage devices.

15. The data storage device of claim 13, wherein, to select the subset of the one or more peer data storage devices, the controller is further configured to determine the subset of the one or more peer data storage devices based on a random selection of one of the one or more peer data storage devices.

16. An apparatus, comprising:
    means for determining whether a request to perform a data transfer operation has been received at a data storage device;
    means for determining whether a request to perform a garbage collection operation is necessary during the data transfer operation;
    means for generating an extended logical-to-physical (L2P) table including information for the data transfer operation in response to determining the request to perform the data transfer operation has been received and the request to perform the garbage collection operation is necessary;
    means for transmitting the extended L2P table to one or more peer data storage devices; and
    means for performing the garbage collection operation after transmitting the extended L2P table to the one or more peer data storage devices.

17. The apparatus of claim 16, further comprising:
    means for identifying a peripheral component interconnect express address of each one of the one or more peer data storage devices; and
    means for receiving log data from the one or more peer data storage devices.

18. The apparatus of claim 16, wherein the request to perform the garbage collection operation is a request after a number of blocks of memory of the data storage device are classified as bad and exceed a predetermined threshold.

19. The apparatus of claim 18, wherein the apparatus further comprises means for receiving log data from the one or more peer data storage devices, and wherein the log data includes at least one of a group consisting of:
    a retired block count,
    a write amplification,
    a percent of drive life remaining,
    a program fail count, an erase count,
a temperature warning,
a critical temperature,
a percent uncorrectable error count,
a percentage of drive life used, and
a number of write counts.

20. The apparatus of claim 16, further comprising means for selecting a subset of the one or more peer data storage devices and transmitting the extended L2P table to the subset of the one or more peer data storage devices.

* * * * *